US008830970B2

(12) United States Patent
Radpour (10) Patent No.: US 8,830,970 B2
(45) Date of Patent: Sep. 9, 2014

(54) SYSTEM-ASSISTED WIRELESS LOCAL AREA NETWORK DETECTION

(75) Inventor: Assad Radpour, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 476 days.

(21) Appl. No.: 12/847,634

(22) Filed: Jul. 30, 2010

(65) Prior Publication Data

US 2012/0026993 A1  Feb. 2, 2012

(51) Int. Cl.
*H04Q 7/24* (2006.01)
*H04W 4/02* (2009.01)
*H04W 84/20* (2009.01)

(52) U.S. Cl.
CPC .............. *H04W 4/021* (2013.01); *H04W 84/20* (2013.01)
USPC ........................................... 370/338; 455/517

(58) Field of Classification Search
CPC ...................................................... H04W 84/20
USPC .................................. 370/338; 455/63.1, 517
See application file for complete search history.

(56) References Cited

U.S. PATENT DOCUMENTS

| | | | |
|---|---|---|---|
| 6,504,503 B1 | 1/2003 | Saint-Hilaire et al. | |
| 7,146,130 B2 | 12/2006 | Hsu | |
| 7,260,079 B1 | 8/2007 | Chapman et al. | |
| 7,277,417 B2 | 10/2007 | Palm et al. | |
| 7,647,171 B2 | 1/2010 | Horvitz et al. | |
| 7,778,593 B2 | 8/2010 | Hsu et al. | |
| 2003/0065443 A1 | 4/2003 | Saint-Hilaire et al. | |
| 2005/0136912 A1 | 6/2005 | Curatolo et al. | |
| 2006/0056322 A1 | 3/2006 | Simpson et al. | |
| 2006/0116170 A1 | 6/2006 | Brahmbhatt et al. | |
| 2006/0149980 A1 | 7/2006 | Zhong | |
| 2007/0143531 A1 | 6/2007 | Atri | |
| 2007/0248067 A1 | 10/2007 | Banerjea et al. | |
| 2009/0061779 A1* | 3/2009 | Gurney et al. | 455/63.1 |
| 2009/0270137 A1 | 10/2009 | Sorensen et al. | |
| 2010/0141400 A1 | 6/2010 | Radulescu et al. | |
| 2010/0159842 A1* | 6/2010 | Fukagawa et al. | 455/67.11 |
| 2010/0240417 A1* | 9/2010 | Wickman et al. | 455/566 |
| 2010/0302102 A1* | 12/2010 | Desai et al. | 342/417 |
| 2011/0038290 A1 | 2/2011 | Gong et al. | |
| 2012/0151207 A1* | 6/2012 | Zhao et al. | 713/156 |

* cited by examiner

*Primary Examiner* — Wanda Z Russell
(74) *Attorney, Agent, or Firm* — Tolar Law Group, PC (57) ABSTRACT

In one or more embodiments, one or more methods and/or systems described can perform determining a position of a mobile device coupled to a first network; determining that the position of the mobile device is within a communications range of at least one wireless access point coupled to a second network; and transmitting a first signal to the mobile device via the first network, where the first signal indicates to apply power or greater power to a transceiver configured to communicate with the at least one wireless access point. In one or more embodiments, the mobile device can include a first transceiver configured to communicate with the first network and a second transceiver configured to communicate with the second network via the at least one wireless access point and can perform receiving the first signal from the first network and applying power or greater power to the second transceiver.

20 Claims, 5 Drawing Sheets

SYSTEM-ASSISTED WIRELESS LOCAL AREA NETWORK DETECTION

BACKGROUND

1. Technical Field

This disclosure relates generally to the field of wireless data communication utilizing at least two different networks and, more specifically, this disclosure pertains to the field of detecting and utilizing wireless local area networks when mobile devices are in sufficient communications range of the wireless local area networks.

2. Description of the Related Art

Networks used for mobile device communications are facing increasing amount of data traffic beyond available capacities. One possible remedy to this issue has been to offload and/or reroute data communications to existing WiFi hotspots where a mobile device automatically detects a WiFi access point at a WiFi hotspot and seamlessly connect to a network available through a WiFi access point. In detecting a WiFi hotspot, however, the mobile device provides power to at least a receiver of a WiFi radio either constantly or at some duty cycle to search for a WiFi hotspot. This places a toll on a battery of the mobile device that results in a short battery life. Because of this, some users of mobile devices resort to turning off this searching feature (e.g., turning off the WiFi radio) to conserve battery lives of the mobile devices they use, which in turn, renders offloading and/or rerouting data communications to existing WiFi hotspots difficult, if not impossible.

BRIEF DESCRIPTION OF THE DRAWINGS

The preferred embodiments will become apparent upon reading the following detailed description and upon reference to the accompanying drawings in which.

While the invention may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

Figure 1:
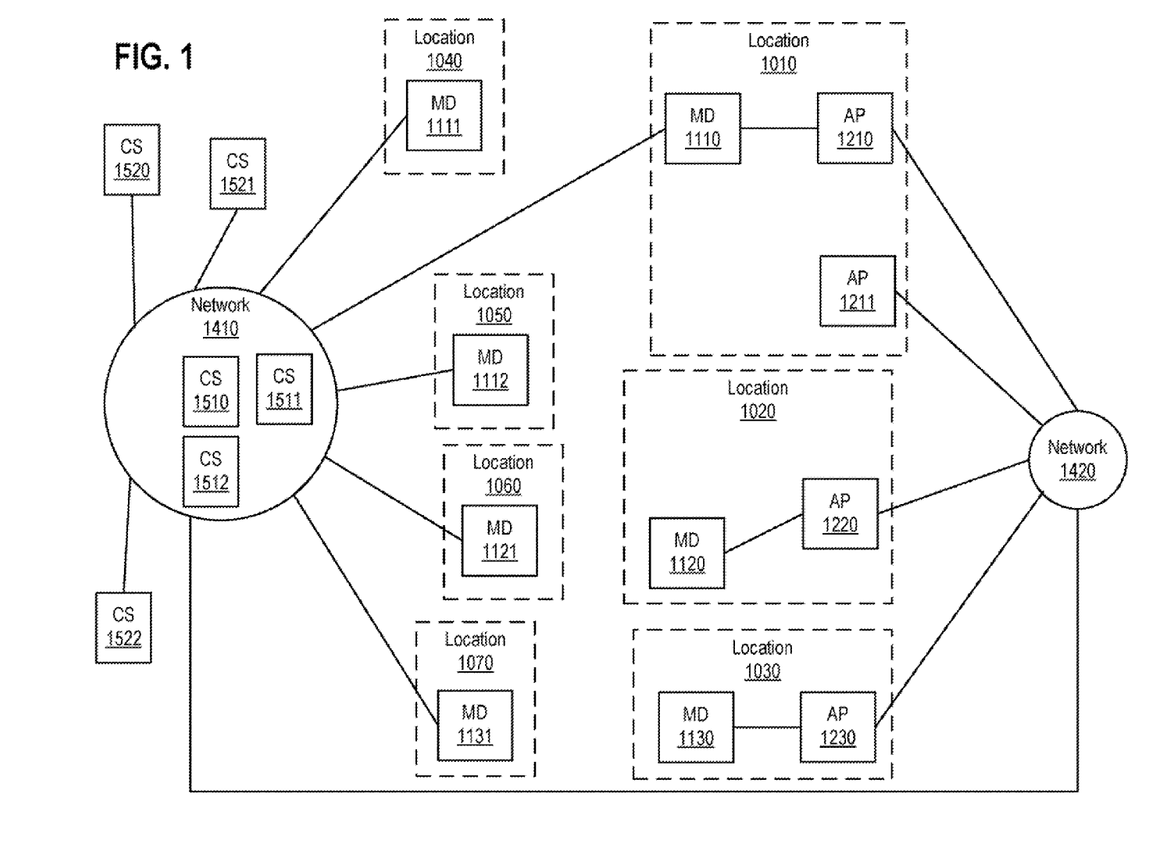
FIG. 1 provides a block diagram of one or more network communications systems, according to one or more embodiments.

FIG. 1 illustrates a block diagram of one or more network communications systems, according to one or more embodiments. As shown, one or more locations 1010-1030 can respectively include one or more wireless access points (APs) 1210 and 1211, 1220, and 1230. In one or more embodiments, locations 1010-1030 can include one or more of businesses, hotels, homes, airports, restaurants, geographic regions, planes, trains, automobiles, and coffee shops, among others. In one or more embodiments, one or more of wireless APs 1210-1230 can be coupled to a network 1420 and can provide communications access of network 1420 to one or more devices coupled to the respective wireless access point (AP).

In one or more embodiments, a mobile device (MD) (e.g., a MD of mobile devices 1110-1131) can communicate, when within a communications range, with a wireless AP (e.g., a wireless AP of wireless APs 1210-1230) using one or more of Institute of Electrical and Electronics Engineers (IEEE) 802.16, IEEE 802.11, IEEE 802.15, IEEE 802.15.4, ZigBee, wireless Ethernet, ultra wide band, wireless universal serial bus (USB) and/or infrared communication technologies, among others. For example, the MD can communicate with the wireless AP when the MD is located at a location that includes the wireless AP. In one or more embodiments, a location can be described and/or defined by an area or volume where communication is possible with one or more wireless APs.

In one or more embodiments, a wireless AP can include and/or implement a wireless local area network (WLAN) that can be accessed by one or more mobile devices (MDs). In one or more embodiments, a wireless AP can include a transceiver to communicate with one or more MDs using one or more wireless methods, processes, protocols, and/or radio spectrums (e.g., frequency ranges). In one example, a wireless AP can communicate with one or more MDs using one or more ISM (industrial, scientific and medical) bands. For instance, an ISM band can include a frequency range of 6.765-6.795 MHz, 433.05-434.79 MHz, 902-928 MHz, 2.4-2.5 GHz, 5.725-5.875 GHz, or 24.0-24.25 GHz, among others.

As illustrated, MDs 1110, 1120, and 1130 can be coupled to a network 1420 via respective wireless APs 1210, 1220, and 1230. In one or more embodiments, network 1420 can provide access and/or services of one or more other networks (e.g., including an Internet) to one more MDs via one or more wireless APs. In one or more embodiments, access to these other networks can include one or more "services" these other networks may provide. For example, these one or more services can include one or more of: email, world wide web (WWW), file transfer, printing, file sharing, file system sharing, remote file system, network file system (NFS), news, multicast, NetBIOS, encryption, domain name service (DNS), routing, tunneling, chat such as Internet Remote Chat and/or instant messaging, gaming, licensing, license management, digital rights management, network time, remote desktop, remote windowing, audio, database (e.g., Oracle, Microsoft SQL Server, MySQL, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more services can utilize, be associated with, and/or correspond to one or more protocols of one or more computer and/or software applications. For example, the one or more protocols can include one or more of Internet protocol (IP), transmission control protocol (TCP), user datagram protocol (UDP), address resolution protocol (ARP), hypertext transfer protocol (HTTP), secure HTTP (HTTPS), network control protocol (NCP), network time protocol (NTP), serial line Internet protocol (SLIP), simple mail transfer protocol (SMTP), simple network management protocol (SNMP), bootstrap protocol (BOOTP), connectionless network protocol (CLNP), dynamic host configuration protocol (DHCP), external gateway protocol (EGP), Internet group management protocol (IGMP), and point-to-point protocol (PPP), among others.

In one or more embodiments, a wireless AP can provide authentication, accounting, authorization, quality of service (QoS), communication traffic shaping, and/or access control from one or more devices coupled to the wireless AP. For example, wireless AP 1210 can include an access control list (ACL) that can be modifiable, and wireless AP 1210 can use the ACL to permit and/or deny access of one or more MDs to network 1420 and/or services associated with network 1420. In one or more embodiments, wireless AP 1210 can perform one or more processes and/or methods that can modify the ACL.

In one or more embodiments, wireless AP 1210 can receive one or more signals from a remote signaling device (e.g., an access control server), and the ACL of wireless AP 1210 can be modified based on the received one or more signals from the remote signaling device. In one or more embodiments, signals and/or signaling can be used in communicating establishment and/or control of communications and/or access to a network, service(s) of the network, and/or resources of the network. For example, the signals and/or signaling can include and/or be based on one or more of Signaling System No. 7 (SS7), Common Channel Signaling System 7 (CCSS7), and RADIUS (Remote Authentication Dial In Service), among others.

In one or more embodiments, signals and/or signaling can be used between two different network providers or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, control data, etc.) that is different than user information transfer (e.g., a telephone conversation between two users, a text message communication between two users, data communication between a MD and a WWW server, etc.).

As illustrated, MDs 1111, 1112, 1121, and 1131 can be coupled to a network 1410. In one or more embodiments, network 1410 can be and/or implement a telecommunications network. For instance, network 1410 can be and/or implement a wireless telecommunications network that can support one or more wireless telecommunications network protocols and/or technologies such as one or more of GSM (global system for mobile communications), UMTS (universal mobile telecommunications system), HSPA (high speed packet access), general packet radio service (GPRS), enhanced data rates for GSM evolution (EDGE), long term evolution (LTE), CDMA (code division multiple access), TDMA (time division multiple access), FDMA (frequency division multiple access), and OFDMA (orthogonal frequency division multiple access), among others. As illustrated, network 1410 can include one or more computer systems 1510-1512 and/or can be coupled to one or more computer systems 1520-1522 that can implement one or more functionalities, methods, and/or processes associated with network 1410. In one or more embodiments, network 1410 can be coupled to and/or include a telephony network that can include a wireless cellular telecommunications network and/or a wireless satellite telecommunications network. In one or more embodiments, the telephony network can communicate information such as voice and/or data. As shown, MDs 1111, 1112, 1121, and 1131 can be at respective locations 1040, 1050, 1060, and 1070.

In one or more embodiments, one or more of MDs 1110-1131 can communicate with network 1410 in a wireless fashion. In one or more embodiments, network 1410 provides access and/or services of one or more other networks at a lower data rate than a network 1420 can provide to one or more of MDs 1110-1131. For example, network 1410 can include less bandwidth than network 1420. In one or more embodiments, network 1410 can provide access and/or services of one or more other networks (e.g., including an Internet) to one or more MDs. For example, network 1410 can provide access and/or services of one or more other networks (e.g., including an Internet) to one or more MDs via one or more base transceiver stations and/or one or more satellites. In one or more embodiments, one or more antennas of a base transceiver station can be mounted on a roof of a building, on a mast, on a tower (e.g., a cellular telephone communications tower), and/or on a side of a structure (e.g., a building, a parking garage, a lamp post, etc.). In one or more embodiments, access to these other networks can include one or more "services" these other networks may provide. In one or more embodiments, the one or more services can utilize, be associated with, and/or correspond to one or more protocols of one or more computer and/or software applications. For example, the one or more "services" these other networks may provide and/or the one or more protocols can be described with reference to network 1420. In one or more embodiments, network 1410 can be coupled to network 1420.

In one or more embodiments, network 1410 and/or network 1420 can include a wired network, a wireless network or a combination of wired and wireless networks. Network 1410 and/or network 1420 can include and/or be coupled to various types of communications networks, such as a public switched telephone network (PSTN), an Internet, a wide area network (WAN) (e.g., a private WAN, a corporate WAN, a public WAN, etc.), a local area network (LAN), etc. In one or more embodiments, a wireless AP can be coupled to a PSTN, e.g., via Ethernet, DSL (digital subscriber line), T1, etc.; a cable (television) based network; a satellite-based system; and/or a fiber based network; among others. In one or more embodiments, network 1410 and/or network 1420 can include one or more wireless networks, e.g., based on IEEE 802.11, IEEE 802.16 and/or LTE, among others. For instance, one or more of wireless APs 1210-1230 can be coupled to network 1420 in a wireless fashion. Network 1410 and/or network 1420 can include one or more DSL and/or cable (e.g., cable television) networks and/or infrastructures. For example, network 1410 and/or network 1420 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1420 may form part of the Internet, or may couple to other networks, e.g., other local or wide area networks such as the Internet. In one or more embodiments, a wireless AP can be a system operable to be coupled to and/or include networking equipment usable to couple the wireless AP to network 1420. In one example, wireless AP 1210 can include a wired interface that can be coupled to a gateway device. For instance, the gateway device can include a cable modem, a DSL modem, a router, a network bridge, etc., and the wired interface of wireless AP 1210 can be coupled to the gateway device via Ethernet, FDDI (fiber distributed data interface), etc.

In one or more embodiments, each MD of MDs 1110-1131 can include and/or can be coupled to one or more transceivers that allow the MD to communicate with network 1410 and/or a wireless AP of wireless APs 1210-1230. For example, MD 1110 can include or be coupled to a first transceiver that can communicate with network 1410 and/or include or be coupled to a second transceiver to communicate with wireless AP 1210. For instance, MD 1110 can include or be coupled to a first transceiver that can communicate with a base transceiver station of or coupled to network 1410 and/or include or be coupled to a second transceiver (e.g., a wireless Ethernet transceiver) to communicate with wireless AP 1210. For instance, MD 1110 can communicate voice data via the first transceiver and IP data (e.g., email data, WWW data, streaming audio data, streaming video data, user application data, etc.) via the second transceiver.

Figure 2:
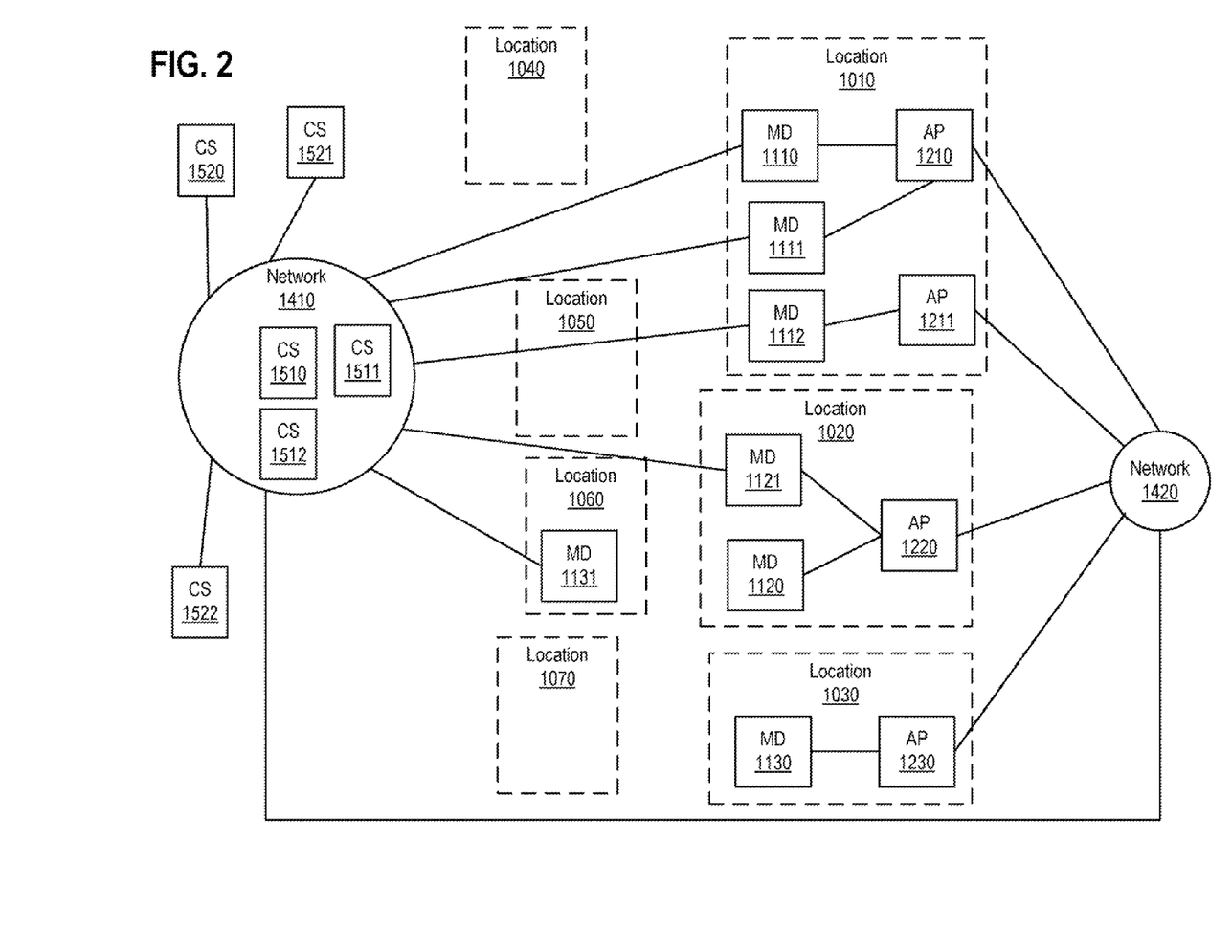
FIG. 2 provides a block diagram of one or more network communications systems, according to one or more embodiments.

Turning now to FIG. 2, a block diagram of one or more network communications systems is illustrated, according to one or more embodiments. As shown, MDs 1111 and 1112 can be located at location 1010, MD 1121 can be located at location 1020, and MD 1131 can be located at location 1060. In one or more embodiments, MDs 1111, 1112, and 1121 can receive a signal from network 1410 that can indicate that communications with one or more wireless APs is possible.

In one example, MD 1111 can include a first transceiver that can be used to communicate with network 1410 and a second transceiver that can be used to communicate with a wireless AP, and MD 1111 can receive a signal from network 1410 that can indicate that communications with one or more wireless APs is possible. For instance, MD 1111 can provide power or additional power to the second transceiver to communicate with one or more wireless APs, in response to the signal from network 1410 indicating that communications with one or more wireless APs is possible. After power or additional power is provided to the second transceiver of MD 1111, MD 1111 can establish communications with wireless AP 1210 and/or can establish communications with network 1420 via wireless AP 1210. Similarly, MDs 1112 and 1121 can establish communications with respective wireless APs 1211 and 1220 in response to respective signals received from network 1410 indicating that communications with one or more wireless APs is possible.

In one or more embodiments, one or more computer systems included in and/or coupled to network 1410 can determine a location of one or more of MDs 1110-1131. In one example, the one or more computer systems can determine MD 1111 to be at location 1010 and can communicate a signal to MD 1111, via network 1410, that indicates communication with one or more wireless APs is possible. Similarly, the one or more computer systems can determine MDs 1112 and 1121 to be at respective locations 1010 and 1020 and can communicate respective signals to MDs 1112 and 1121, via network 1410, that indicate communications with one or more wireless APs may be possible.

In one or more embodiments, the one or more computer systems can determine that a MD is at a location (e.g., a location of locations 1010-1030) via one or more methods and/or processes. In one or more embodiments, the one or more methods and/or processes to determine that a MD is at a location can include comparing position information (e.g., latitude, longitude, altitude, etc.) of the MD with position information of a location that includes at least one wireless AP. In one example, the position information of the MD can be determined using data from a global position system (GPS) device and/or mechanism. For instance, the GPS device and/or mechanism can be included in the MD, and the MD can communicate position information from the GPS device and/or mechanism to the one or more computer systems (e.g., one or more of computer systems 1510-1522) via network 1410. In a second example, the position information of the MD can be determined using a triangulation method and/or process. For instance, at least three base transceiver stations can communicate with the MD, and strength of a signal and/or timing the signal propagation from the MD to the at least three cellular telephone towers can be used in determining the position information of the MD.

In a third example, strength of a signal from the MD to an antenna of a base transceiver station can be used in determining the position information of the MD. For instance, the strength of the signal transmitted from the MD can be different from the strength of the signal received by the antenna, and a distance from the antenna can be determined based on a difference in transmitted strength of the signal and received strength of the signal. For example, a computer system (e.g., a computer system of computer systems 1510-1522) can communicate a signal to the MD, where the signal includes information that indicates a first signal strength, and the MD can transmit one or more signals, at or close to the first signal strength, to network 1410. Network 1410 can receive, at a second signal strength, the one or more signals transmitted by the MD, where the second signal strength is less than the first signal strength due to path loss, terrain, etc. In one or more embodiments, determining the distance from the antenna can be based on determining a path loss attenuation depending on a prevailing location-dependent path loss attenuation factor.

In one or more embodiments, a data structure stored in a memory medium can include terrain and/or data clutter information that can be used in determining the distance from the antenna of a base transceiver station using a calculation based on the difference in transmitted strength of the signal and received strength of the signal. In one or more embodiments, comparing position information of the MD with position information of a location that includes at least one wireless AP can include a set of one or more comparisons of a set of one or more locations that are in a vicinity of an antenna of a base transceiver station, that can communicate with the MD, with the position information of the MD. In one or more embodiments, the vicinity of the antenna that can communicate with the MD can include a sector of an area or volume covered by the antenna, and the set of one or more locations can include one or more locations within the sector.

Figure 3:
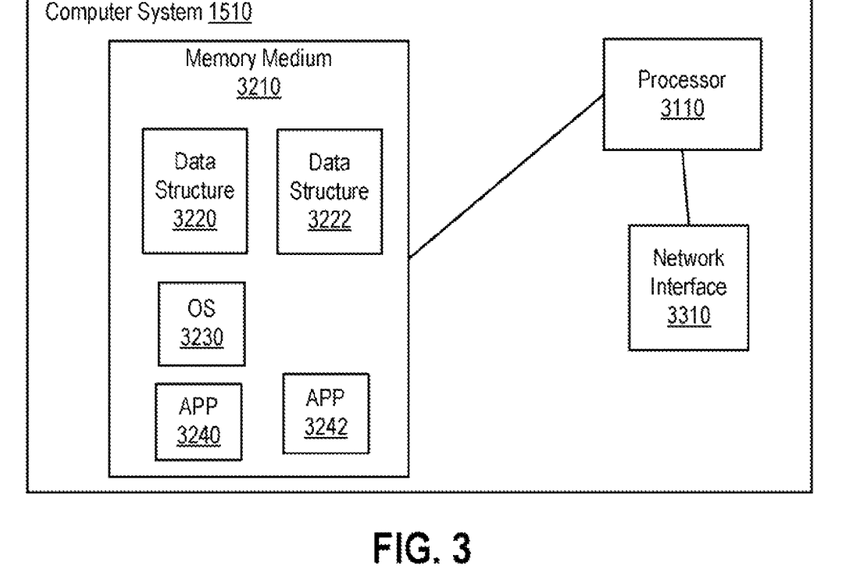
FIG. 3 provides block diagram of a computer system, according to one or more embodiments.

Turning now to FIG. 3, a block diagram of a computer system is illustrated, according to one or more embodiments. As shown, computer system (CS) 1510 can include a memory medium 3210 coupled to a processor 3110, and computer system 1510 can include a network interface 3310. In one or more embodiments, memory medium 3210 can include one or more data structures 3220 and 3222, one or more applications (APPs) 3240 and 3242, and/or an operating system (OS) 3230 that can include instructions executable by processor 3110 and/or data to implement one or more methods and/or one or more systems associated with computer system 1510. In one or more embodiments, computer system 1510 may be any of various types of devices, including a server computer system, a networking appliance, and/or a core network server such as a home location register (HLR) or a home subscriber server (HSS), among others. In one or more embodiments, processor 3110 can include one or more cores, and each core of processor 3110 can implement an instruction set architecture (ISA). In one or more embodiments, one or more of computer systems 1511, 1512, and 1520-1522 can include same or similar structures and/or functionality as described with reference to computer system 1510.

Figure 4:
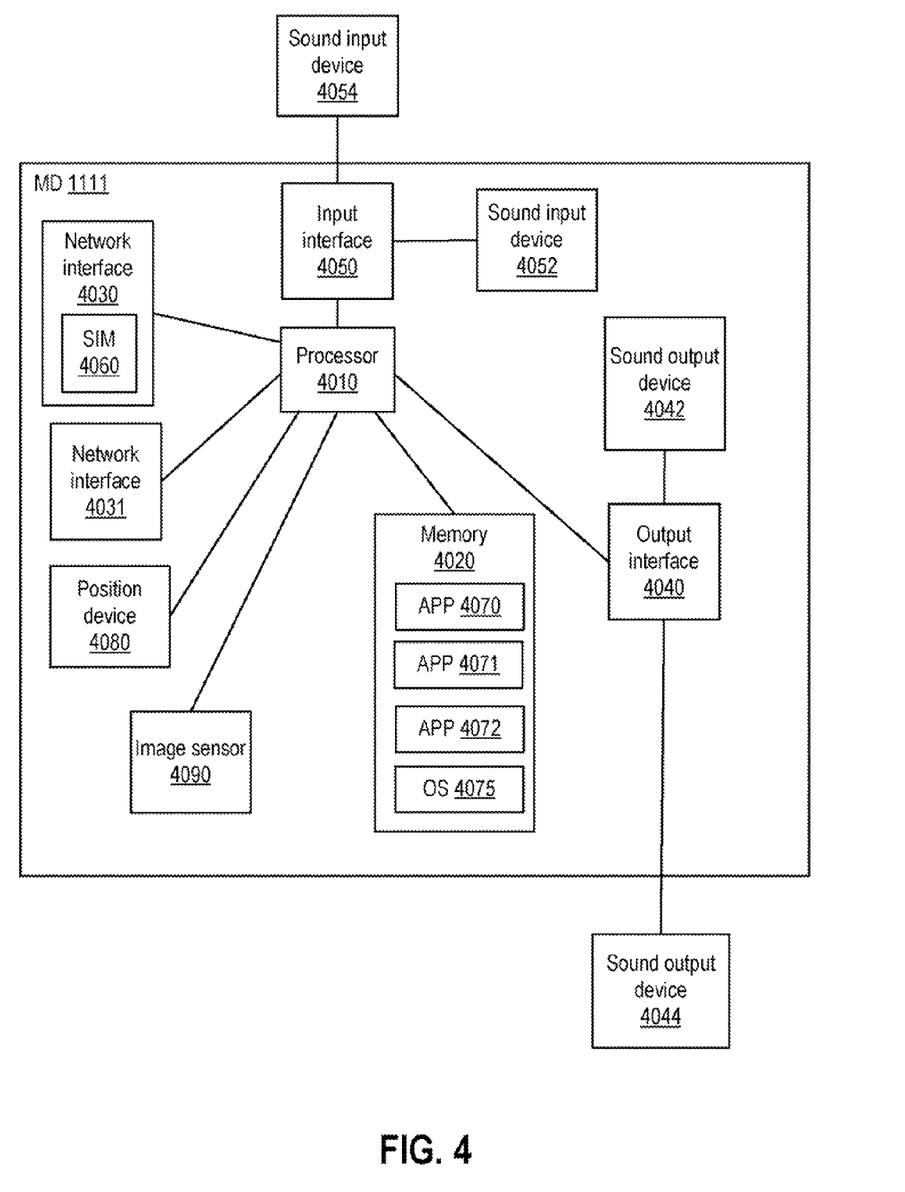
FIG. 4 provides a block diagram of a mobile device, according to one or more embodiments.

Turning now to FIG. 4, a block diagram of a mobile device is illustrated, according to one or more embodiments. As shown, MD 1111 can include a memory medium 4020 coupled to a processor 4010, and MD 1111 can include one or more network interfaces 4030 and 4031, a user output interface 4040, a user input interface 4050, a position device 4080, and an image sensor 4090, among others, coupled to processor 4010. In one or more embodiments, memory medium 4020 can include one or more applications (APPs) 4070-4072 and/or an operating system (OS) 4075 that can include instructions executable by processor 4010 to implement one or more methods and/or one or more systems associated with MD 1111. In one or more embodiments, MD 1111 may be any of various types of devices, including a computer system, such as a portable computer, a tablet computing device, a personal digital assistant (PDA), a mobile telephone (e.g., a cellular telephone, a satellite telephone, etc.), a wearable computing device, an Internet appliance, a communications device, a handheld mobile computing device, or other wired or wireless device. In one or more embodiments, processor 4010 can include one or more cores, and each core of processor 4010 can implement an instruction set architecture (ISA).

In one or more embodiments, user output interface 4040 can be used to convey information (e.g., text, graphic, video, haptic, audio, etc.) to a user of MD 1111. For example, MD 1111 may include a display (e.g., a display screen) that can be used to convey text, graphic, image, motion picture, and/or video information to a user of MD 1111. In one or more embodiments, MD 1111 can include a sound output device 4042 coupled to user output interface 4040. In one or more embodiments, sound output device 4042 can include a device and/or circuitry that can produce one or more sounds.

In one or more embodiments, user output interface 4040 can be coupled to a sound output device 4044. In one instance, sound output device 4044 can include one or more of an amplifier and/or a speaker. In another instance, sound output device 4044 can include one or more earphones. In one or more embodiments, user output interface 4040 can be coupled to sound output device 4044 in a wired fashion. In one or more embodiments, user output interface 4040 can be coupled to sound output device 4044 in a wireless fashion. In one example, user output interface 4040 can communicate sound information to output device 4044 using an ISM band. For instance, user output interface 4040 can communicate sound information to sound output device 4044 using one or more of a personal area network (PAN), IEEE 802.15, IEEE 802.15.4, ZigBee, 6LoWPAN, frequency modulation of a carrier wave, amplitude modulation of a carrier wave, light signals, and serial pulses, among others. In one or more embodiments, sound output device 4044 can be or be included in a device that includes an IEEE 802.15 receiver or transceiver, such as a Bluetooth headset or earpiece.

In one or more embodiments, user input interface 4050 can be used to receive sounds from a user of MD 1111. In one example, MD 1111 can include a sound input device 4052 coupled to user input interface 4050. In one instance, sound input device 4052 can include a microphone. In another example, a sound input device 4054 coupled to user input interface 4050. In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 4050 can be coupled to sound input device 4054 in a wired fashion. In one or more embodiments, user input interface 4050 can be coupled to sound input device 4054 in a wireless fashion. In one example, user input interface 4050 can communicate sound information to sound input device 4054 using an ISM band. For instance, sound input device 4054 can communicate sound information to user input interface 4050 using one or more of a PAN, IEEE 802.15, IEEE 802.15.4, ZigBee, 6LoWPAN, frequency modulation of a carrier wave, amplitude modulation of a carrier wave, light signals, and serial pulses, among others. In one or more embodiments, sound input device 4054 can be or be included in a device that includes an IEEE 802.15 transmitter or transceiver, such as a Bluetooth headset or microphone.

In one or more embodiments, user input interface can be used to receive user input from a user of MD 1111. In one example, MD 1111 may include a keyboard that can be used to receive user input from a user of MD 1111. In another example, MD 1111 may include one or more sensors that can be used to receive user input from a user of MD 1111. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 4040 and user input interface 4050 can be used to implement a keyboard. For example, user output interface 4040 can be used to present an image of a keyboard, and user input interface 4050 can receive a position of user input on the image of the keyboard to determine a received key of the keyboard.

In one or more embodiments, network interface 4030 can include a transceiver that is operable to communicate information with network 1410. In one or more embodiments, network interface 4030 can be used to couple MD 1111 to network 1410, and MD 1111 can use network interface 4030 to communicate information (e.g., data, voice data, etc.) with network 1410. In one or more embodiments, network interface 4030 can include a subscriber identity module (SIM) 4060. In one or more embodiments, SIM 4060 can securely store an international mobile subscriber identity (IMSI) which can include a unique number and/or identity associated with a GSM network and/or an UMTS network, which can be or be included in network 1410. In one example, the unique number and/or identity can be used to determine information corresponding to MD 1111 from a HLR, a HSS, and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS mobile network, which can be or be included in network 1410. For example, the MSISDN can include a telephone number corresponding to SIM 4060. In one instance, the MSISDN can include a country code, a national destination code, and a subscriber number. In another instance, the MSISDN can include a country code, a number planning area, and a subscriber number.

In one or more embodiments, SIM 4060 can be embodied in a removable card (e.g., a SIM card) that can be removed from a first MD associated with a first subscriber account and placed in a second MD, so that the second MD can be associated with the first subscriber account. For example, SIM 4060 embodied as a SIM card can be associated with a first subscriber account and used in MD 1111, thereby associating MD 1111 with the first subscriber account; SIM 4060 can be removed from MD 1111, thereby disassociating MD 1111 with the first subscriber account; and SIM 4060 can be placed in MD 1121, thereby associating MD 1121 with the first subscriber account.

In one or more embodiments, network interface 4031 can be used to communicate with one or more wireless APs. In one example, network interface 4031 can be configured and used to communicate with wireless AP 1210 in a wireless fashion. In one or more embodiments, network interface 4031 can include a transceiver that is operable to communicate information with one or more wireless APs.

In one or more embodiments, MD 1111 can include a position device 4080 coupled to processor 4010. In one example, position device 4080 can include a GPS receiver. In another example, position device 4080 can include a terrestrial radio navigation system receiver such as LORAN (LOng RAnge Navigation). In one or more embodiments, position device 4080 can provide one or more services such as one or more of positioning, navigation, and timing to processor 4010. For example, a positioning service can provide one or more of latitude information, longitude information, altitude information, and accuracy information (e.g., a radius of uncertainty for a geographic location or position).

In one or more embodiments, position device 4080 can provide heading information. For example, position device 4080 can include a compass and/or implement a compass to provide heading information. In one or more embodiments, position device 4080 can provide device position information such as tilt and/or angle information. For example, position device 4080 can include one or more of an accelerometer and an electronic gyroscope. In one or more embodiments, the compass can be electronically gimbaled using one or more of an accelerometer and an electronic gyroscope.

In one or more embodiments, electronic image sensor 4090 can provide digital data of one or more of an image, a motion picture, and a video. For example, electronic image sensor 4090 can be or include a digital camera. In one or more embodiments, the digital data of one or more of an image, a motion picture, and a video can include one or more formats. For example the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, among others.

Figure 5:
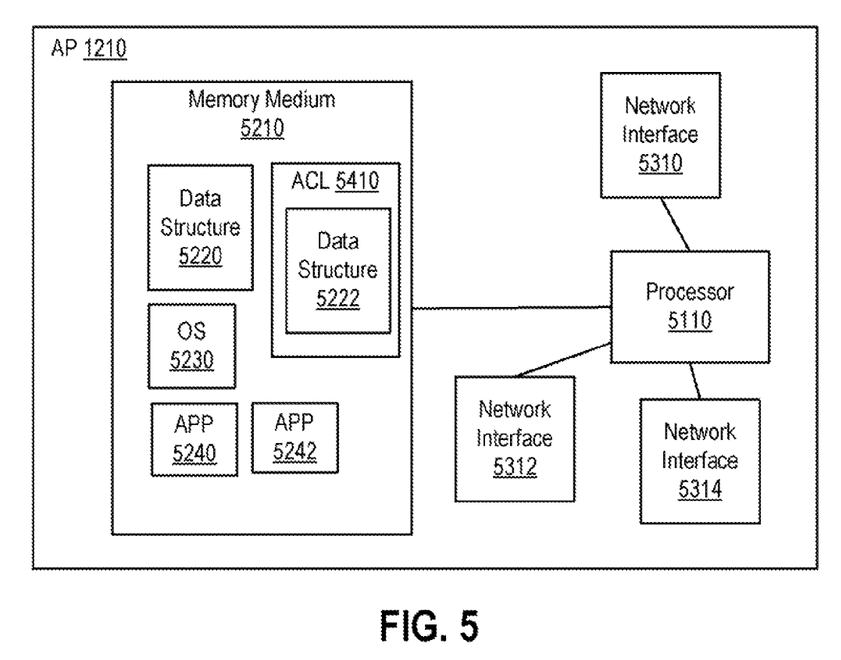
FIG. 5 provides a block diagram of a wireless access point, according to one or more embodiments.

Turning now to FIG. 5, a block diagram of a wireless access point is illustrated, according to one or more embodiments. As shown, wireless AP 1210 can include a memory medium 5210 coupled to a processor 5110, and wireless AP 1210 can include one or more network interfaces 5310-5314 coupled to processor 5110.

In one or more embodiments, a network interface (e.g., a network interface from network interfaces 5310-5314) can be coupled to network 1420. In one example, network interface 5310 can implement an Ethernet interface that is operable to be coupled to a gateway device, where the gateway device is operable to be coupled to network 1420. In another example, network interface 5310 can implement a WiMax network interface that is operable to be coupled to a WiMax access point that is operable to be coupled to network 1420. In one or more embodiments, a network interface (e.g., a network interface from network interfaces 5310-5314) can be coupled to one or more MDs in a wireless fashion. In one example, network interface 5312 can implement an IEEE 802.11 interface that can wirelessly communicate with one or more MDs. In another example, network interface 5314 can implement a wireless USB interface that can wireless communicate with one or more MDs.

As shown, memory medium 5210 can include an Access Control List (ACL) 5410, one or more data structures 5220 and 5222, one or more applications (APPs) 5240 and 5242 and/or an operating system (OS) 5230 that can store data and/or instructions executable by processor 5110 to implement one or more systems, processes, and/or methods described herein. In one or more embodiments, one or more of APs 1211, 1220, and 1230 can include same and/or similar structures and/or functionalities as described with reference to AP 1210.

In one or more embodiments, the term "memory medium" can mean a "memory" and/or "tangible computer readable medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product that stores instructions executable by a processor to implement one or more methods and/or processes described herein. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, PDA, laptop, mobile telephone, mobile multimedia device, embedded computer system, television system, and/or other device. In general, the terms "computing device", "computer", and/or "computer system" can be broadly defined to encompass any device having a processor which executes instructions from a memory medium. A CPU or processing unit in one or more systems executing code and data from a memory medium includes a means for executing one or more software program according to the methods and/or flowcharts described herein.

Figure 6:
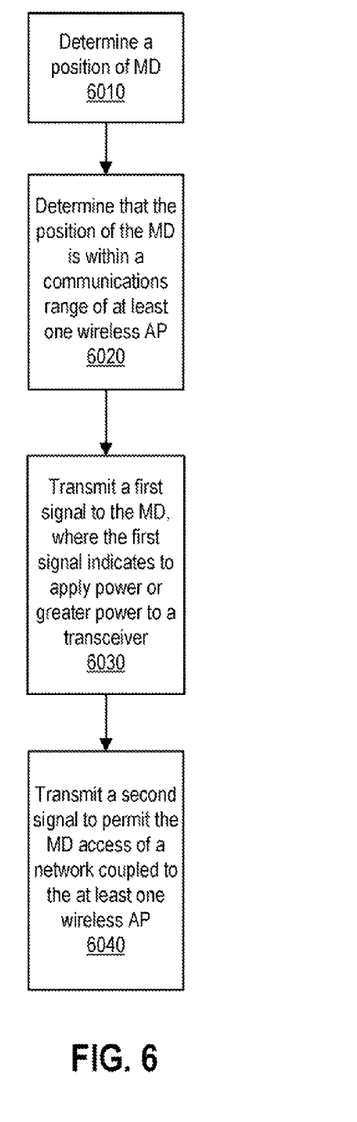
FIG. 6 provides a diagram of a method to direct a mobile device, communicating with a first network, to communicate with a second network, according to one or more embodiments.

Turning now to FIG. 6, a method to direct a mobile device, communicating with a first network, to communicate with a second network is illustrated, according to one or more embodiments. At 6010, a position of a MD (e.g., a MD of MDs 1110-1131) can be determined. For example, one or more computer systems (e.g., one or more of computer systems 1510-1522) can determine the position of the mobile device. In one or more embodiments, the position of the MD can be associated with position information (e.g., latitude, longitude, altitude, etc.), and the one or more computer systems can determine the position information associated with the position of the MD.

In one example, the position information can be determined using data from a GPS device and/or mechanism. For instance, the GPS device and/or mechanism can be included in the MD, and the MD can communicate position information from the GPS device and/or mechanism to the one or more computer systems via the first network (e.g., network 1410). In another example, the position information can be determined using a triangulation method and/or process. For instance, at least three antennas of at least three respective base transceiver stations included in or coupled to the first network can receive one or more signals from the MD, and strength of the one or more signals and/or timing the signal propagation from the MD to the at least three antennas of at least three respective base transceiver stations can be used in determining the position information.

In one or more embodiments, strength of a signal from the MD to an antenna of a base transceiver station included in or coupled to the first network can be utilized in determining the distance information. For example, a first strength of a signal transmitted from the MD can be different from a second strength of the signal received by the antenna, and a distance from the antenna can be determined based on a difference in transmitted strength of the signal and received strength of the signal. For instance, the one or more computer systems can communicate a signal to the MD, where the signal includes information that indicates the first signal strength, and the MD can transmit one or more signals, at or close to the first signal strength, to the first network. The first network can receive, at the second signal strength, the one or more signals transmitted by the MD, where the second signal strength is less than the first signal strength due to path loss, terrain, etc.

Since the second received signal strength can depend on free space path loss, air path loss, terrain path loss (e.g., hills, valleys, mountains, vegetation, etc.), and/or structure pass loss (e.g., buildings, bridges, towers, etc.), among others, a data structure that includes information associated with these dependencies can be utilized in determining a path loss attenuation factor and/or a zonal position based on signal strength, according to one or more embodiments. In one example, a received first signal strength from MD 1131 at location 1060 and a second received signal strength from MD 1121 at location 1020 can be the same or similar while distances of location 1060 and location 1020 to respective first and second antennas of a base transceiver station can be different. For instance, a distance of location 1020 to the second antenna of the base transceiver station can be greater than a distance of location 1060 to the first antenna of the base transceiver station, and the second received signal strength from MD 1121 can be affected by over the air path loss while the first received signal strength from MD 1131 can be affected by structure pass loss.

In one or more embodiments, utilizing directional, antenna arrays, or beam-forming smart antennas at a base station can be used and/or aid in marginalizing the MD position within an attenuation factor zone determined from the difference in the first transmitted signal strength and the second received signal strengths with path loss factor information of the data structure. In one or more embodiments, the marginalized position of the MD can be used to detect from a database, the availability of any wireless access points AP in that vicinity.

At 6020, the one or more computer systems can determine that the position of the MD is within a communications range of at least one wireless AP (e.g., at least one of wireless APs 1210-1230) coupled to the second network (e.g., network 1420). For example, MD 1111 can be determined to be at location 1010 that includes a communications range of wireless AP 1210. In one or more embodiments, the communications range of the at least one wireless AP can include a measure of tens of feet to a few hundred feet.

In one or more embodiments, a memory medium can store a data structure that includes position information (e.g., latitude, longitude, altitude, etc.) and communications ranges associated with one or more wireless APs. For example, data structure 3220 can include position information and communications ranges of one or more of wireless APs 1210-1230. In one or more embodiments, data structure 3220 can include network operator information, charging structure information, and/or offered service(s) information associated with one or more wireless APs 1210-1230. In one or more embodiments, data structure 3220 can include subscriber data and/or subscriber preference information. For example, the subscriber preference information can include one or more of a preference of network operator, no preference of network operator, a preference of one or more private wireless APs (e.g., one or more wireless APs at one or more of a home, a business, a social club, a country club, a yacht club, etc.).

In one or more embodiments, the position information of one or more of wireless APs 1210-1230 included in data structure 3220 can be indexed via one or more policies, schemes, and/or methods. In one example, the position information of one or more of wireless APs 1210-1230 included in data structure 3220 can be indexed via antennas of base transceiver stations and/or coverage sectors of one or more base transceiver stations. In a second example, the position information of one or more of wireless APs 1210-1230 included in data structure 3220 can be indexed via geographic region. For instance, a geographic region can include an area (e.g., a park, a portion of a city, a city, a state, a combination of coverage areas of antennas of base transceiver stations, etc.). In another example, the position information of one or more of wireless APs 1210-1230 included in data structure 3220 can be indexed via mobile telephone carrier, network provider, etc. In one or more embodiments, determining that the position of the MD is within the communications range of the at least one wireless AP coupled to the second network can include searching the data structure via at least one index.

In one or more embodiments, data structure 3220 can be included in a database management system (DBMS) and/or can be accessed by other computer systems (e.g., computer systems 1511-1522) via a network. In one example, data structure 3220 can be included in a remote database management system (RDBMS) that can be accessed by other computer systems via a network. For instance, data structure 3220 can be included in a RDBMS such as Oracle, Microsoft SQL Server, MySQL, PostgreSQL, etc.

In one or more embodiments, a data structure that includes position information (e.g., latitude, longitude, altitude, etc.) associated with one or more wireless APs can be distributed between or among two or more computer systems (e.g., computer systems 1510-1522). For example, the data structure that includes position information associated with the one or more wireless APs can be distributed between or among two or more home location registers (HLRs), visitor location registers (VLRs), and/or home subscriber servers (HSSs). In one or more embodiments, a portion of the data structure that includes position information associated with the one or more wireless APs can be duplicated. For example, a VLR can receive and/or store a portion of the data structure. For instance, the MD may be determined to be roaming on another carrier's network (e.g., another carrier can be different than a carrier subscribed or identified by information included in a SIM card of the MD), and a VLR can store a duplicated portion of the data structure.

In one or more embodiments, determining that the position of the MD is within the communications range of the at least one wireless AP coupled to the second network can include comparing the position information associated with the MD with position information of one or more wireless APs. For example, the position information of one or more of wireless APs 1210-1230 included in data structure 3220 can be compared with the position information associated with the MD to determine that the position of the MD is within the communications range of the at least one wireless AP. In one or more embodiments, a portion of the position information of one or more of wireless APs 1210-1230 included in data structure 3220 can be compared with the position information associated with the MD to determine that the position of the MD is within the communications range of the at least one wireless AP. In one example, the MD can be communicating with a base transceiver station, via an antenna of the base transceiver, station and a portion of the position information of one or more of wireless APs 1210-1230 included in data structure 3220 can include one or more wireless APs 1210-1230 that are located in a coverage area of the cellular telephone tower. In one instance, the MD communicating with the base transceiver can be determined to be within a sector of coverage area covered by an antenna of the base transceiver station, and a portion of the position information of one or more of wireless APs 1210-1230 included in data structure 3220 can include one or more wireless APs 1210-1230 are located within the sector of coverage area.

At 6030, a first signal, indicating to apply power or greater power (e.g., additional power) to a transceiver configured to communicate with a wireless AP, can be transmitted to the MD. For example, the first signal can indicate to MD 1111 to apply power or greater power to network interface 4031. In one instance, MD 1111 may not apply power to network interface 4031, and in response to the first signal, MD 1111 can apply power to network interface 4031. In a second instance, network 4031 can be in a lower power state and/or a sleep state, and MD 1111 can apply greater power to network interface 4031 in response to the first signal. In one or more embodiments, transmitting the first signal can include utilizing a control channel (e.g., a fast association control channel (FACCH), a common control channel (CCCH), etc.) or a short message service (SMS) message, among others. For example, the first signal can include a WiFi-On command to indicate, to the MD, to apply power or greater power (e.g., additional power) to the transceiver configured to communicate with a wireless AP. For instance, transmitting a WiFi-On command can utilize one or more of a FACCH, a CCCH, and a SMS message, among others.

In one or more embodiments, the first signal can indicate to the MD that the MD is to route at least a portion of data via the at least one wireless AP. For example, the first signal can indicate to the MD that the MD is to route packet-switched network data via the at least one wireless AP. In one instance, the packet-switched network data can include WWW data, email data, motion pictures, streaming audio, etc. In another instance, the packet-switched network data can include data that is carried via one or more protocols designed to use a packet-switched network (e.g., an IP network).

At 6040, a second signal can be transmitted to indicate that the MD is permitted to access the second network via the at least one access point. In one or more embodiments, the second signal can include an access grant message addressed to one or more servers and/or one or more wireless APs.

Figure 7:
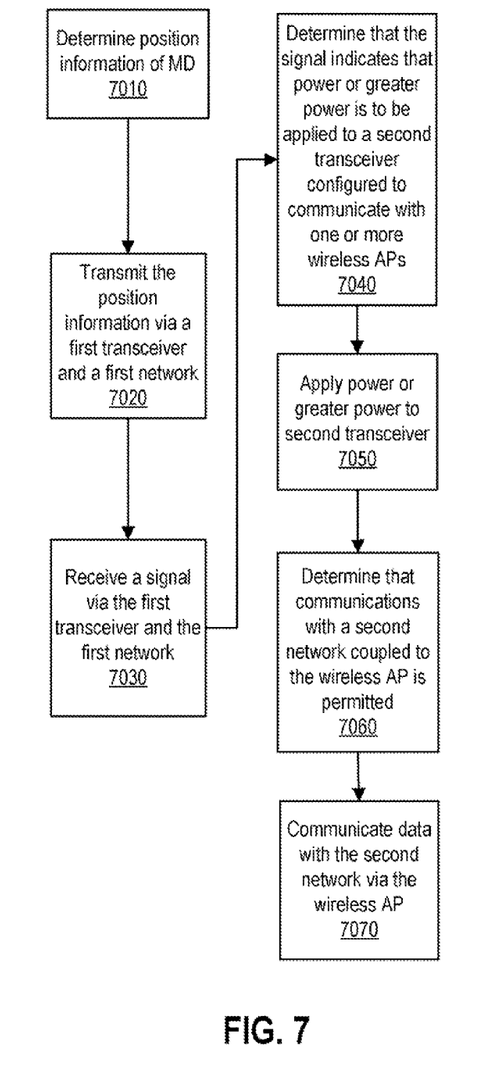
FIG. 7 provides a diagram of a method of operating a mobile device, according to one or more embodiments.

Turning now to FIG. 7, a method of operating a mobile device communicating with a first network is illustrated, according to one or more embodiments. At 7010, position information associated with a MD can be determined. For example, MD 1111 can determine position information (e.g., latitude, longitude, altitude, etc.) using position device 4080. At 7020, the MD can transmit the position information via a first transceiver and the first network. For example, MD 1111 can transmit the position information via network interface 4030 and network 1410. At 7030, the MD can receive a signal via the first transceiver and the first network.

At 7040, it can be determined that the signal indicates that power or greater power (e.g., additional power) is to be applied to a second transceiver configured to communicate with one or more wireless APs. For example, MD 1111 can determine that the signal indicates that power or greater power is to be applied to network interface 4031. In one or more embodiments, network interface 4031 or the second transceiver which can be associated with network interface 4031 may not receive power or may be in a reduced power or sleep state. In one or more embodiments, not providing power or providing a reduced power level to network interface 4031 or the second transceiver which can be associated with network interface 4031 can conserve power produced by and/or stored in a mobile power source of the MD. For example, the mobile power source can include one or more of a battery, a fuel cell, and a solar cell, among others. In one or more embodiments, the mobile power source can be included in the MD.

At 7050, power or greater power can be applied to the second transceiver. In one example, power can be applied to the second transceiver and/or network interface 4031. In another example, the second transceiver can be in a sleep state, and a signal can be applied to the second transceiver indicating to the second transceiver to exit the sleep state. In one or more embodiments, after the second transceiver exits the sleep state, it can consume more power, and indicating to the second transceiver to exit the sleep state to consume more power can be applying greater power to the second transceiver and/or network interface 4031.

At 7060, the MD can determine if communications with the second network is permitted. At 7070, the MD can communicate data with the second network via the wireless AP. In one or more embodiments, the MD can route packet-switched network data via the second network and route voice data (e.g., telephone calls) via the first network. In one example, the packet-switched network data can include WWW data, email data, motion pictures, streaming audio, etc. In another example, the packet-switched network data can include data that is carried via one or more protocols designed to use a packet-switched network (e.g., an IP network).

It is noted that, in one or more embodiments, one or more of the method elements described herein and/or one or more portions of an implementation of a method element may be performed in varying orders, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements. For example, one or more computer systems 1510-1522 can concurrently implement some or all method element of FIG. 6 for use with two or more of MDs 1110-1131.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   determining, at a computing device of a first network, that a mobile device that is not in communication with a wireless access point of a second network is within a communications range of the wireless access point, wherein the mobile device is distinct from the computing device; and
   in response to determining that the mobile device is within the communications range of the wireless access point, transmitting a first signal from the computing device to the mobile device via the first network, wherein the first signal instructs the mobile device to apply power or greater power to a transceiver configured to communicate with the wireless access point.

2. The method of claim 1, wherein determining that the mobile device is within the communications range of the wireless access point includes comparing a position of the wireless access point with a position of the mobile device.

3. The method of claim 2, the method further comprising:
   determining a sector of coverage of a base transceiver station,
   wherein the mobile device is coupled to the first network via the base transceiver station,
   wherein the sector of coverage includes the position of the mobile device, and
   wherein comparing the position of the wireless access point with the position of the mobile device includes determining that the position of the wireless access point is included in the sector of coverage.

4. The method of claim 1, wherein determining that the mobile device is within the communications range of the wireless access point includes receiving position information from the mobile device via the first network.

5. The method of claim 1, wherein determining that the mobile device is within the communications range of the wireless access point includes determining a path loss attenuation factor.

6. The method of claim 1, further comprising:
   transmitting a second signal, wherein the second signal is usable in granting access of the second network to the mobile device.

7. The method of claim 1, wherein determining that the mobile device is within the communications range of the wireless access point includes searching a data structure via at least one index, wherein the data structure includes position information associated with a plurality of wireless access points.

8. A computer-readable storage device storing instructions that, when executed by a processor, cause the processor to perform operations comprising:
   determining, at a computing device of a first network, that a mobile device that is not in communication with a wireless access point of a second network is within a communications range of the wireless access point, wherein the mobile device is distinct from the computing device; and
   in response to determining that the mobile device is within the communications range of the wireless access point, transmitting a first signal from the computing device to the mobile device via the first network, wherein the first signal instructs the mobile device to apply power or greater power to a transceiver configured to communicate with the wireless access point.

9. The computer-readable storage device of claim 8, wherein determining that the mobile device is within the communications range of the wireless access point is based on a comparison of a position of the wireless access point with a position of the mobile device.

10. The computer-readable storage device of claim 9, wherein the mobile device is coupled to the first network via a base transceiver station, and wherein the operations further comprise determining a sector of coverage of the base transceiver station that includes the position of the mobile device, and wherein the comparison includes determining whether the position of the at least one wireless access point is included in the sector of coverage.

11. The computer-readable storage device of claim 8, wherein the operations further comprise:
    receiving position information from the mobile device via the first network, wherein a position of the mobile device is determined based on the received position information.

12. The computer-readable storage device of claim 8, wherein the operations further comprise:
    determining a path loss attenuation factor, wherein a position of the mobile device is determined based on the path loss attenuation factor.

13. The computer-readable storage device of claim 8, wherein the operations further comprise transmitting a second signal, wherein the second signal is usable in granting access of the second network to the mobile device.

14. The computer-readable storage device of claim 8, wherein the operations further comprise:
    searching a data structure via at least one index, wherein the data structure includes position information associated with a plurality of wireless access points, wherein the determination that the mobile device is within the communications range of the wireless access point is based on the position information.

15. A mobile device, comprising:
    a processor;
    a first transceiver coupled to the processor and configured to communicate with a first network; and a second transceiver coupled to the processor and configured to communicate with a second network;
wherein the processor is configured to perform operations including:
receiving a signal from a computing device via the first network and via the first transceiver, wherein the signal indicates that the mobile device is within communications range of a wireless access point of the second network, and wherein the signal is received while the mobile device is not in communication with the wireless access point;
applying power or greater power to the second transceiver in response to the signal; and
after applying power or greater power to the second transceiver, communicating with the wireless access point via the second transceiver.

16. The mobile device of claim 15, wherein the signal further indicates that packet-switched network data is to be routed via the wireless access point, and wherein the operations further include, in response to the signal, routing the packet-switched network data to the second transceiver to be communicated via the wireless access point to the second network.

17. The mobile device of claim 16, wherein the operations further include transmitting, via the second transceiver, the packet-switched network data to the wireless access point via an Institute of Electrical and Electronics Engineers 802.11 protocol.

18. The mobile device of claim 15, further comprising:
a position device configured to determine a position of the mobile device,
wherein the operations further include:
determining, via the position device, the position of the mobile device; and
transmitting, via the first network, position information associated with the position of the mobile device to a computer device system.

19. The mobile device of claim 15, wherein the mobile device includes a mobile power source that provides power to the mobile device and wherein the mobile power source includes a battery, a fuel cell, a solar cell, or a combination thereof.

20. The method of claim 1, wherein the first network is a cellular telecommunications network, and wherein the second network is a wireless local area network.

* * * * *